2,861,188

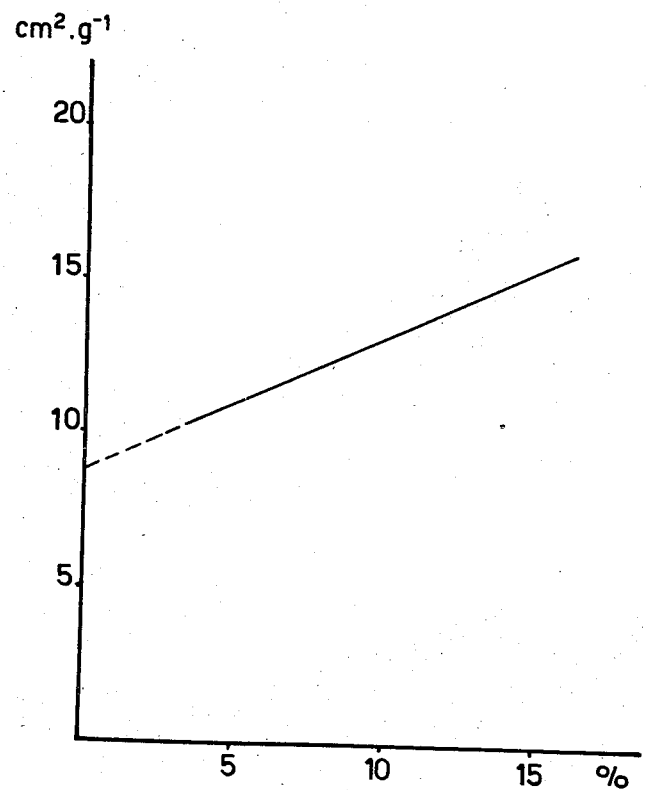

COAL TESTING METHOD

Hendrik Dijkstra, Geleen, Netherlands, assignor to Stamicarbon N. V., Heerlen, Netherlands Application March 5, 1954, Serial No. 414,375

Claims priority, application Netherlands March 7, 1953

4 Claims. (Cl. 250—83).

The present invention relates to a method of testing coal for determining the content of incombustible material present therein and to the application of such method in coal preparation processes.

Several methods have been suggested for determining the content of incombustible material (hereinafter and in the claims hereof called "the ash content") in coal, other than the customary and cumbersome method involving combustion of coal samples. These alternative methods permit of a more rapid determination of the ash content than is possible by the combustion method and are mostly devised to avoid any question of chemical conversion of the coal during the determination, and, in some cases, also to avoid the necessity of taking separate samples of the coal.

One of such alternative methods involves the measurement of the Roentgen ray absorption capacity of the coal.

The technique of measuring the Roentgen ray absorption, e. g., by a sample of solid substance in finely ground condition, has been sufficiently developed to enable a comparatively rapid and automatic measurement to be made.

The results hitherto obtained by this method have been such, however, that the method has not been regarded as suitable for practical application in coal preparation processes. (See, e. g., Liebhafsky et al., Anal. Chem. 19,865 (1947).) This may be ascribed to the fact that variation in the Roentgen ray absorption capacity of the coal is not merely due to fluctuations in the total ash content of the coal, but also to fluctuations in the relatively complex composition of the incombustible material constituting the said ash content.

In view of such composition fluctuation, and in view of the fact that different elements have different Roentgen ray absorption characteristics, it is impossible as a rule, from the absorption of an arbitrarily chosen Roentgen radiation, whether it be a monochromatic or a polychromatic radiation, to draw conclusions as to the total ash content of coal.

In particular, fluctuations in the iron content of the coal exert a considerable influence on the absorption measurement and this has hitherto been considered to be an insurmountable obstacle preventing the application of Roentgen radiation in determining the ash content of coal (see for example Belugou and Conjeaud, preprint B 6 for the Conférence Internationale sur la préparation des charbons, page 17, Paris, 1950).

The main object of the present invention is to provide a method of testing coal for determining the ash content thereof by means of measurement of the Roentgen ray absorption capacity of the coal, which method yields substantially reliable results in spite of the relatively great fluctuations in the composition of the incombustible material present in the coal to be tested as are encountered in practice.

Particularly, the object of the invention is to provide such method for dealing with coal of widely fluctuating iron content as is generally the case with raw run-of-mine coal of any description.

A further object of the invention is to provide an improved method of the kind defined for dealing with coal in which besides the iron content also the calcium content shows appreciable fluctuation in practice.

Further objects will appear hereinafter and in the claims hereof.

According to the invention there is employed for the said measurement, a technical Roentgen radiation composed substantially entirely of waves having a length greater than 1.74 A. U.

By the term "technical Roentgen radiation" as employed in this specification and the claims hereof, is to be understood a radiation composed substantially entirely of waves having a length smaller than 4.5 A. U.

The invention is based on the insight that difficulty arising from fluctuations in the composition of the non-combustible material may be met by employing a Roentgen radiation which is not appreciably contributed to by waves of a length value at which there is a marked difference between the mass absorption coeficients of those elements which occur therein in substantially fluctuating and relatively large amounts.

It is found that by employing radiation waves of a length greater than 1.74 A. U., which is the wave length at which the K-absorption edge of iron occurs, the mass absorption coefficient of the iron can be kept within such limits, that with those fluctuations in the composition of the non-combustible material in the coal which are encountered in practice, a sufficiently accurate measurement of the absorption capacity and, consequently, a sufficiently reliable determination of the ash content is possible.

The Roentgen radiation to be employed according to the invention is rather soft; the layer thickness, i. e., the amount in grams of solid matter to be irradiated per cm.$^2$ cross section of the Roentgen ray beam employed must not therefore be too great, while the sensitivity of the means for measuring the absorption capacity must be relatively high.

Within the limits permitted by the invention it is of advantage for keeping down the required degree of sensitivity of the measuring means to use a radiation of the greatest possible hardness and effective intensity. It is therefore preferred to generate the necessary Roentgen radiation in a tube provided with a cobalt anode, in combination, if desired, with a monochromator and/or a filter, the apparatus being operated in such a manner that substantially no rays with a wave length smaller than 1.74 A. U. are emitted.

Greater accuracy of the measurement may be obtained by employing a technical Roentgen radiation composed substantially entirely of waves with a length greater than 3.06 A. U., which is the wave length at which the K-absorption edge of calcium occurs, thus permitting accurate measurement with coal in which besides the iron content also the calcium content shows appreciable fluctuations. This mode of operation, however, increases the demands on the measuring apparatus and the operating conditions: for example, it will be necessary in many such cases to operate in vacuo.

The method according to the invention may be applied in determining fluctuations in the ash content of raw run-of-mine coal, e. g., for quality estimation. Those ash content fluctuations recurring at relatively short intervals are normally automatically levelled by that mixing of the coal which occurs during its transportation, e. g., up to the dressing plant, and in the dressing plant itself. The present method may be usefully applied, however, in the determination of fluctuations occurring over longer periods, assuming that during the periods in question there is no appreciable fluctuation in the composition of the combustible material of the coal, which components also affect the Roentgen ray absorption capacity, be it in a subordinate degree, as the said combustible material is substantially composed of light elements.

If the method according to the invention is to be applied for determining ash content fluctuations over periods in which substantial fluctuations in the composition of the combustible material of the coal are to be reckoned with, it will be necessary at intervals otherwise to determine the composition of the combustible material of the coal and to make such adjustments as may be necessary, e. g., in the dressing plant, following upon any variation which may be found.

In the preparation of coal, it is usual to effect control of the dressing plant, preferably in an automatic and continuous manner, in dependence on marked fluctuations in the ash content of the coal, with a view to obtaining a coal of a certain predetermined quality, i. e., coal with an ash content which is constant within certain limits.

Such a control is necessary because unless, e. g., the separatory devices employed in the coal washing, are appropriately adjusted, undesirable fluctuations in the ash content of the dressed coal might arise as a consequence of considerable fluctuation in the ash content of the raw run-of-mine coal.

In practice it is customary to draw samples at regular intervals from the dressed coal, to determine the ash content of the samples, and to control the separatory device, e. g., the specific gravity of the separating medium in a fluid washer, in dependence on fluctuations in ash content occurring as between successive samples.

Essential conditions which must be fulfilled by such a control are that each sample must be representative of the coal obtained in a given period, and that the interval between the moment of sampling and the moment when following the determination, there is brought about, automatically or otherwise, any necessary adjustment of the separator or other device, must be short.

In order to ensure a useful control, it is customary, therefore, to combine a frequent drawing of small representative samples with the speediest possible determination of ash content fluctuation.

The method according to the present invention is well suited for use in providing such control in coal processing. As previously stated the technique of measuring the Roentgen ray absorption by a sample of solid substance in finely ground condition has been sufficiently developed to enable a comparatively rapid and automatic measurement to be effected. Moreover, fluctuation in the Roentgen ray absorption capacity as measured in accordance with the invention may be readily converted into an impulse for effecting the desired control in an automatic manner. Apparatus is available for effecting the absorption capacity measurements in question, which is sufficiently robust to permit it to be installed in a coal washery proper. The apparatus may be so installed in combination with an automatic sampler and crushing device.

In practice, employing the method according to the invention in a coal washery plant, using the fluctuations in absorption capacity for effecting automatic control of the coal washers, the latter have been automatically controlled to maintain the ash content of the dressed coal constant within 0.5%, the technical Roentgen radiation employed being substantially entirely composed of waves having a length greater than 1.74 A. U.

In the accompanying graph, for further elucidation of the invention, the mass absorption coefficient in cm.$^2 \cdot$g.$^{-1}$ as determined in the subjection of twenty samples of washed coal, substantially differing in composition of the incombustible material contained therein, have been plotted along the ordinate against the ash content of the samples expressed in percents by weight plotted along the abscissa. The ash content of the samples was established by means of the common combustion method.

The iron content of the ash obtained from these samples, calculated as $Fe_2O_3$, fluctuated between 10.4 and 6.7 percents by weight. The calcium content, calculated as $CaO$, fluctuated between 4.3 and 3.1 percents by weight.

For the purpose of measuring the Roentgen ray absorption capacity, use was made of a Roentgen tube with cobalt anode and beryllium window, operated at a voltage of 14 kv. and provided with a quartz monochromator, thus producing a radiation with a sharp intensity maximum at 1.79 A. U.

The sample irradiated in each test consisted of 47 mg. of coal, ground to a mean particle size of 0.3 mm. and filled into a cylindrical cuvette measuring 7 mm. in diameter and provided with a bottom constituted by a beryllium window.

The intensity of the incident and transmitted Roentgen radiations was measured with the aid of Geiger-Müller counters.

As appears from the graph, there is a linear relationship between the values of the mass absorption coefficients measured and the ash contents.

Extrapolation of the straight line denoting this relationship towards the position corresponding to an ash content of 0% gives the mean average mass absorption coefficient of the combustible material in the coal samples. Besides the above-mentioned check on the composition, this affords a means for periodically determining how far the absorption capacity of the combustible material in the coal may still be considered as constant.

It will be appreciated, that the method according to the invention is also applicable in those cases where no separate samples of the coal concerned are taken but a continuous and homogeneous stream of finely ground coal is continuously or periodically irradiated by Roentgen rays for the purpose of obtaining measuring or controlling impulses based on variation in the Roentgen ray absorption capacity of the coal.

I claim:

1. A method of testing coal to determine the ash content thereof, comprising the steps of subjecting the coal to X-ray radiation composed substantially entirely of rays having a wave length greater than 1.74 A. U., and measuring the X-ray absorption capacity of the coal, the X-ray absorption capacity being empirically related to the ash content.

2. A method of testing coal to determine the ash content thereof, comprising the steps of subjecting the coal to X-ray radiation composed substantially entirely of rays having a wave length greater than 3.06 A. U., and measuring the X-ray absorption capacity of the coal, the X-ray absorption capacity being empirically related to the ash content.

3. A controlled method of cleaning coal in which the ash content of the cleaned coal may be maintained within predetermined limits, comprising the steps of washing a stream of coal in a liquid separating medium, subjecting successive samples of the coal to X-ray radiation composed substantially entirely of rays having a wave length greater than 1.74 A. U., measuring the X-ray absorption capacity of said samples, and adjusting the specific gravity of the liquid separating medium in accordance with fluctuations in the X-ray absorption capacity of the samples as a measure of the ash content thereof.

4. A controlled method of cleaning coal in which the ash content of the cleaned coal may be maintained within predetermined limits, comprising the steps of washing a stream of coal in a liquid separating medium, subjecting successive samples of the coal to X-ray radiation composed substantially entirely of rays having a wave length greater than 3.06 A. U., measuring the X-ray absorption capacity of said samples, and adjusting the specific gravity of the liquid separating medium in accordance with fluctuations in the X-ray absorption capacity of the samples as a measure of the ash content thereof.

References Cited in the file of this patent

UNITED STATES PATENTS

| | | |
|---|---|---|
| 2,316,239 | Hare | Apr. 13, 1943 |
| 2,534,352 | Herzog | Dec. 19, 1950 |

OTHER REFERENCES

"Chemical Analysis by X-ray Absorption," Liebhafsky et al., General Electric Review, April 1945, pp. 36–39.

"Chemical Analysis Based on X-ray Absorption," Liebhafsky et al., Analytical Chemistry, vol. 19, 1947, pp. 861–865.

"Determination of Tetraethyllead in Gasoline by X-ray Abcorption," Levine et al., Analytical Chemistry, vol. 23, 1951, pp. 1293–1296.

"Analytical Methods based on X-ray Absorption," Liebhafsky, Analytical Chemistry, vol. 25, 1953, pp. 689–692.